(12) United States Patent
Grinder (10) Patent No.: US 11,191,987 B2
(45) Date of Patent: Dec. 7, 2021

(54) FIREFIGHTER TRAINING ASSEMBLY (71) Applicant: Jonathan Drew Grinder, odenton, MD (US)

(72) Inventor: Jonathan Drew Grinder, odenton, MD (US)

( * ) Notice: Subject to any disclaimer, the term of this patent is extended or adjusted under 35 U.S.C. 154(b) by 228 days.

(21) Appl. No.: 16/691,980

(22) Filed: Nov. 22, 2019

(65) Prior Publication Data

US 2021/0154509 A1 May 27, 2021

(51) Int. Cl.
*A62C 99/00* (2010.01)
*G09B 9/00* (2006.01)

(52) U.S. Cl.
CPC .......... *A62C 99/0081* (2013.01); *G09B 9/00* (2013.01)

(58) Field of Classification Search
CPC ........ A62C 99/0081; G09B 9/00; G09B 1/02; A47J 37/07; A47J 37/781; A47J 2037/0777
See application file for complete search history.

(56) References Cited

U.S. PATENT DOCUMENTS

| | | | | | |
|---|---|---|---|---|---|
| 5,411,397 | A | * | 5/1995 | Rogers | A62C 99/0081 434/226 |
| 5,447,437 | A | * | 9/1995 | Joynt | A62C 99/0081 434/226 |
| 6,866,513 | B2 | * | 3/2005 | Hough | G09B 9/00 434/226 |
| 7,175,439 | B2 | * | 2/2007 | Darois | G09B 19/00 434/226 |
| 2016/0293023 | A1 | * | 10/2016 | Bloemker | A62C 99/0081 |

* cited by examiner

*Primary Examiner* — Timothy A Musselman
(74) *Attorney, Agent, or Firm* — Sheppard, Mullin, Richter & Hampton LLP (57) ABSTRACT

An assembly for burning class A fuels during firefighter training. The assembly has enhanced smoke generating characteristics for simulating a realistic room fire in training exercises. In particular, the assembly is designed with ease of setup and to increase the amount of smoke generated during combustion so that a realistic room fire involving modern housing materials can be simulated.

12 Claims, 6 Drawing Sheets

FIREFIGHTER TRAINING ASSEMBLY

FIELD OF THE INVENTION

Devices, systems, and methods consistent with the invention relate to an assembly for burning class A fuels during firefighter training. More specifically, the present invention relates to an assembly, system, and method designed to increase the amount of smoke generated during combustion so that a realistic room fire involving modern housing materials can be simulated.

BACKGROUND OF THE INVENTION

The use of live fires is a critical component of firefighter training because it allows firefighters to safely prepare for real fires in a controlled setting under supervision. During these controlled fires, firefighters learn how to handle the stress of an emergency situation encountered in a realistic and unpredictable fire that is dangerous to their life and health. By learning to manage themselves and their equipment in these training environments, firefighters can become more effective in real-world firefighting scenarios and departments can reduce the risk of injuries on the job.

Most fire departments conduct their live fire training in accordance with National Fire Protection Association ("NFPA") Standard 1403. To simulate fighting the typical structure fire, departments use training buildings, which are purpose-built structures in which controlled fires are set for trainees to extinguish. The training buildings are normally constructed of fireproof materials, such as concrete, brick, or the like, such that they may be reused after the controlled fires are extinguished. The controlled fires generally use ordinary combustible class A materials—such as wood pallets, plywood, straw, hay, baled excelsior, and anything else that leaves ash—as fuel for these trainings. As compared to other materials, Class A materials tend to generate significant amounts of heat but relatively less smoke during combustion.

Wood pallets can be commonly found and are often used as the main class A fuel for interior live fire trainings. These pallets can be set on their ends on the floor and then leaned against each other to form a teepee-like or A-frame shape. This forms a space or void under and between the pallets where a starter fuel or kindling, which is often also a class A material, may be placed. This starter fuel may then be lit to initiate a combustion process that generates enough heat to ignite the pallets surrounding it. The pallets in this arrangement are also called the main fuel.

A steady and consistent burn is created when heat from the starter fuel ignites the main fuel. While the combined arrangement of main fuel and starter fuel burns, it gives off significant amounts of heat and some smoke. This generation of heat and smoke can be useful for preparing firefighters for real firefighting conditions.

However, the use of pallets in this matter is inadequate for training firefighters for a number of reasons. First, the pallets are typically arranged directly on the floor of the enclosed training room or area, which results in reduced airflow during combustion, and consequently, reduces the heat generated by the combustion process. Direct contact with the floor can also result in unwanted scorching of the floor and makes disposal and cleaning more difficult after training is concluded.

Second, conventional methods that use the aforementioned class A fuels do not generate enough smoke to realistically simulate the characteristics of a real room fire in modern buildings. This is because modern construction and furnishings often use complex mixtures of glues, resins, and other materials that were not typically found in structures in the past. In a fire, these modern materials undergo more incomplete combustion than ordinary class A materials, and thus typically generate significantly more smoke.

It is therefore desirable to simulate these enhanced smoke environments so that firefighters are prepared for realistic firefighting conditions while also remaining within the NFPA 1403 standard for conducting live fire trainings.

Accordingly, there is a need for an assembly for burning class A fuels during firefighter training that overcomes the aforementioned problems with conventional designs and techniques. In an exemplary embodiment of the invention, class A fuel is arranged on a base raised off the floor to provide improved airflow and avoid floor damage. In another exemplary embodiment of the invention, a class A fuel with a comparatively higher glue or resin content is used in conjunction with ordinary class A fuels to enhance the smoke characteristics of the training fire.

The use of the inventive assembly to practice the aforementioned method provides for easy, repeatable setup of these training fires.

BRIEF SUMMARY OF THE INVENTION

According to an aspect of the invention, there is provided an assembly for firefighter training, including: a base comprising a lattice structure, a plurality of legs supporting the base, first and second lateral support members arranged on first and second lateral sides of said base in opposition, respectively, and arranged to prevent lateral slippage of a first flammable material arranged on the base for burning, and first and second retaining members arranged on a third lateral side of said base, and arranged to retain a second flammable material.

According to a second aspect of the invention, there is provided an assembly for firefighter training, including a base comprising a lattice structure, a plurality of legs supporting the base, a main fuel support structure arranged above and parallel to the base, arranged to engage upper edges of a first flammable material arranged on the base for burning; and first and second retaining members arranged on a lateral side of said base and extending perpendicular to the main fuel support structure, arranged to retain a second flammable material.

According to a third aspect of the invention, there is provided a method for firefighter training, including providing an assembly comprising a base having a lattice structure, a plurality of legs supporting the base, first and second lateral support members arranged on first and second lateral sides of said base in opposition, and first and second retaining members arranged on a third lateral side of said base, arranging a first flammable material on the base such that at least one of the first and second lateral support members may prevent lateral slippage of the first flammable material, arranging a second flammable material such that it is retained by at least one of the first and second retaining members, and causing the first flammable material to burn, wherein the first and second flammable materials are arranged at a distance from each other that allows the radiative heat from the burning of the first flammable material to ignite the second flammable material.

According to a fourth aspect of the invention, there is provided a method for firefighter training, including providing an assembly comprising a base having a lattice structure, a plurality of legs supporting the base, a main fuel support structure arranged above and parallel to the base, and first and second retaining members arranged on a lateral side of said base and extending perpendicular to the main fuel support structure, arranging a first flammable material on the base such that it engages the main fuel support structure, arranging a second flammable material such that it is retained by at least one of the first and second retaining members, and causing the first flammable material to burn, wherein the first and second flammable materials are arranged at a distance from each other that allows the radiative heat from the burning of the first flammable material to ignite the second flammable material.

The above stated aspect, as well as other aspects, features and advantages of the invention will become clear to those skilled in the art upon review of the following description. It should be understood that the description and specific examples, while describing several exemplary embodiments, are intended for purposes of illustration only and are not intended to limit the scope of the disclosure.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF THE INVENTION

Exemplary embodiments of the invention will now be described below by reference to the attached Figures. The described exemplary embodiments are intended to assist the understanding of the invention and are not intended to limit the scope of the invention in any way. Like reference numerals refer to like elements throughout.

Figure 1:
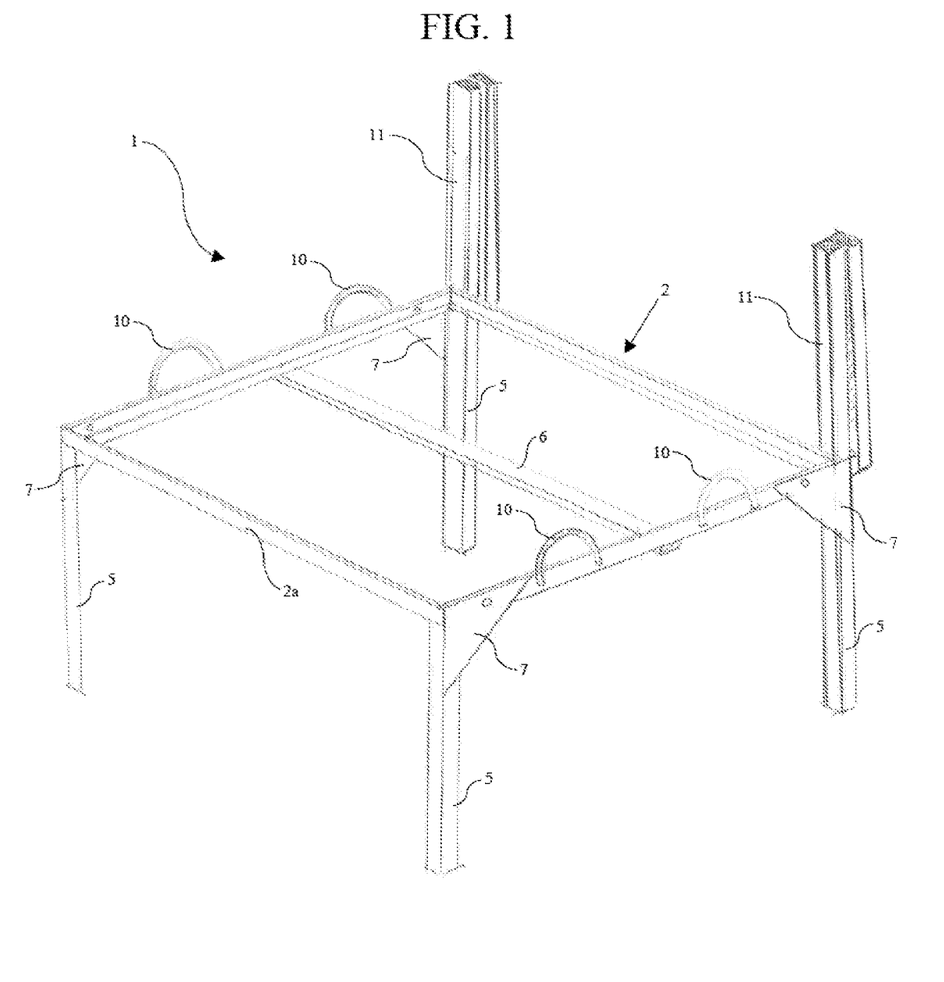
FIG. 1 provides a perspective view of a firefighter training assembly according to an exemplary embodiment of the present disclosure.
Figure 2:
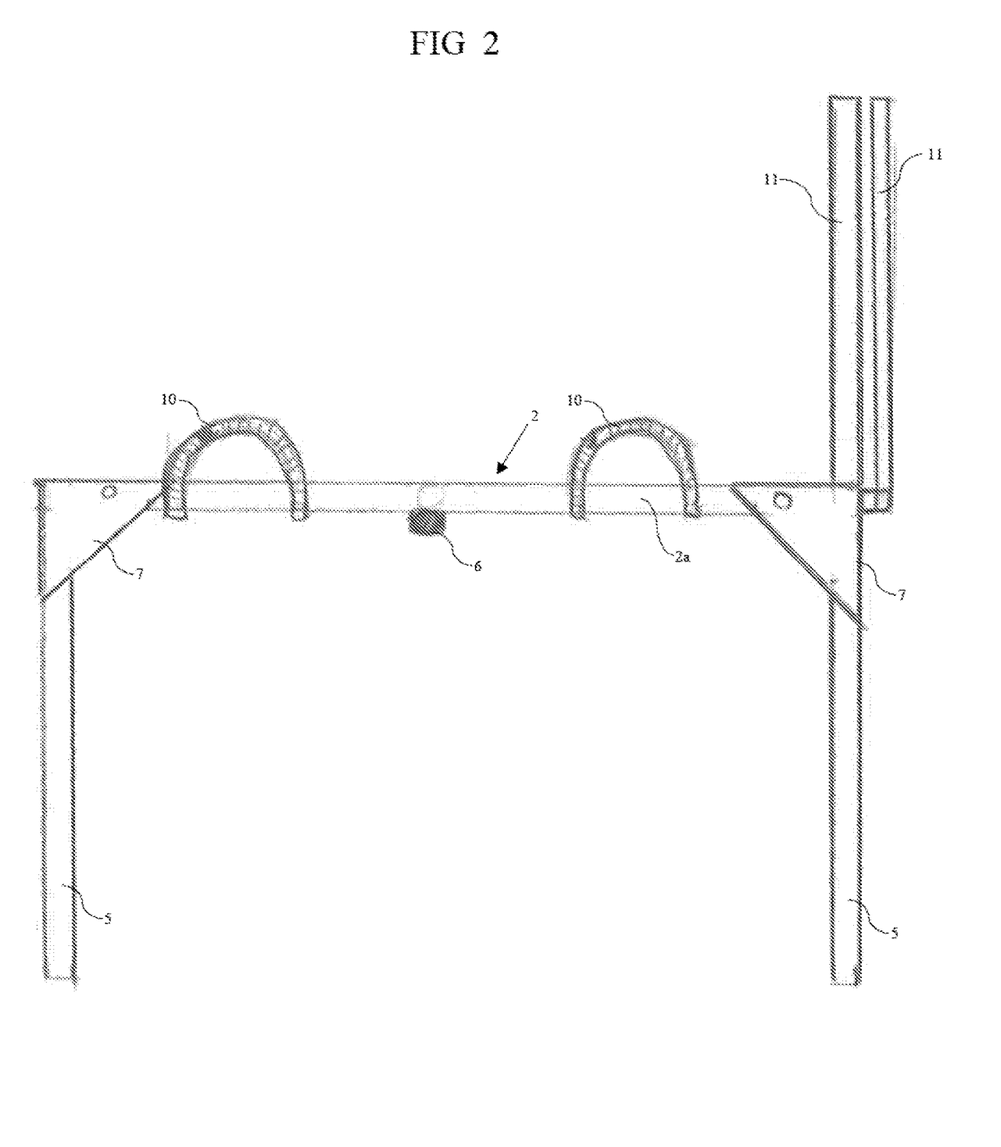
FIG. 2 provides a side view of the firefighter training assembly of FIG. 1.
Figure 3:
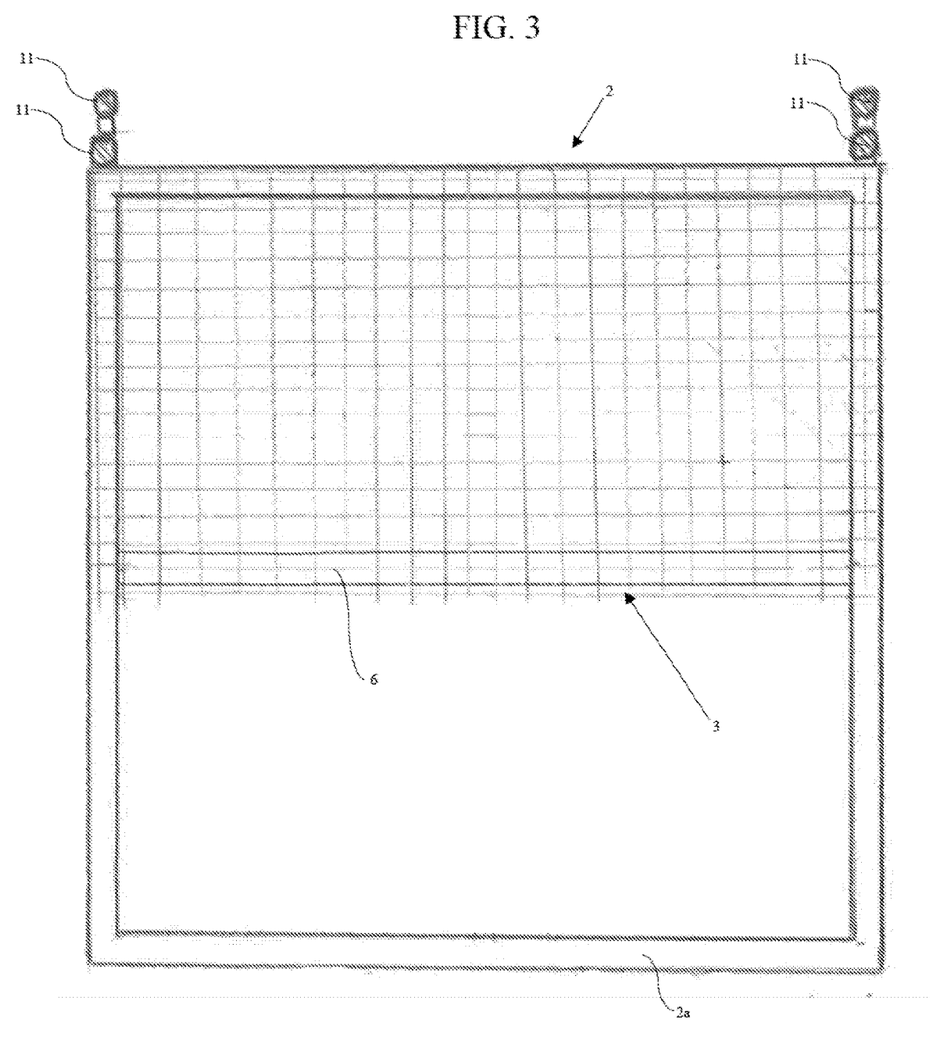
FIG. 3 provides a top perspective view of the firefighter training assembly of FIG. 1, wherein the catwalk grating is illustrated.

An exemplary embodiment of the inventive training assembly is shown in FIGS. 1-3. The assembly 1 includes a base 2 to support combustible materials used during training exercises. Base 2 is made of a frame 2a and a lattice structure 3. Lattice structure 3 allows for the support and retention of a first flammable material 4 (or main fuel) as it burns, while also allowing this material to safely ash on the ground as it burns.

In the exemplary embodiment, base 2 is illustrated as rectangular, but any appropriate shape may be utilized. In the exemplary embodiment, lattice structure 3 is formed of section(s) of 1" thick steel catwalk grating welded on top of frame 2a, but any appropriate material and thickness that provides the requisite functionality may be used. Finally, in the exemplary embodiment, frame 2a is formed of lengths of 2" by 3" tube steel welded together, but any appropriate material may be used.

Assembly 1 further includes four legs 5, which position the base 2 at a desired height h above the ground and support the entire assembly 1. Height h is set to provide appropriate airflow to combustible materials placed on base 2 and to generate a desired amount of smoke when the combustible materials are burning. In this exemplary embodiment, legs 5 are formed of tube steel and welded to each corner of the base 2, but any appropriate material and construction may be used.

Assembly 1 further includes a center support structure 6 provided under the base 2 to provide structural reinforcement. In the exemplary embodiment, support structure 6 is arranged to roughly bisect the rectangular shape of base 2. Support structure 6 may be arranged along either axis of such a rectangular shape, or may be appropriately arranged to provide structural support in the bases of other shapes. Multiple or no support structures 6 may be utilized where appropriate, depending on the materials and shape used for base 2 and lattice structure 3.

Assembly 1 further includes gusset plates 7, which provide further structural reinforcement and connect the four legs 5 to each corner of the base 2. In the exemplary embodiment, corresponding holes are also drilled into the legs 5, base 2, and gusset plates 7 so that bolts may be inserted to fasten the legs 5 to the base 2. Alternative connection methods are also possible, such as welding.

Figure 4:
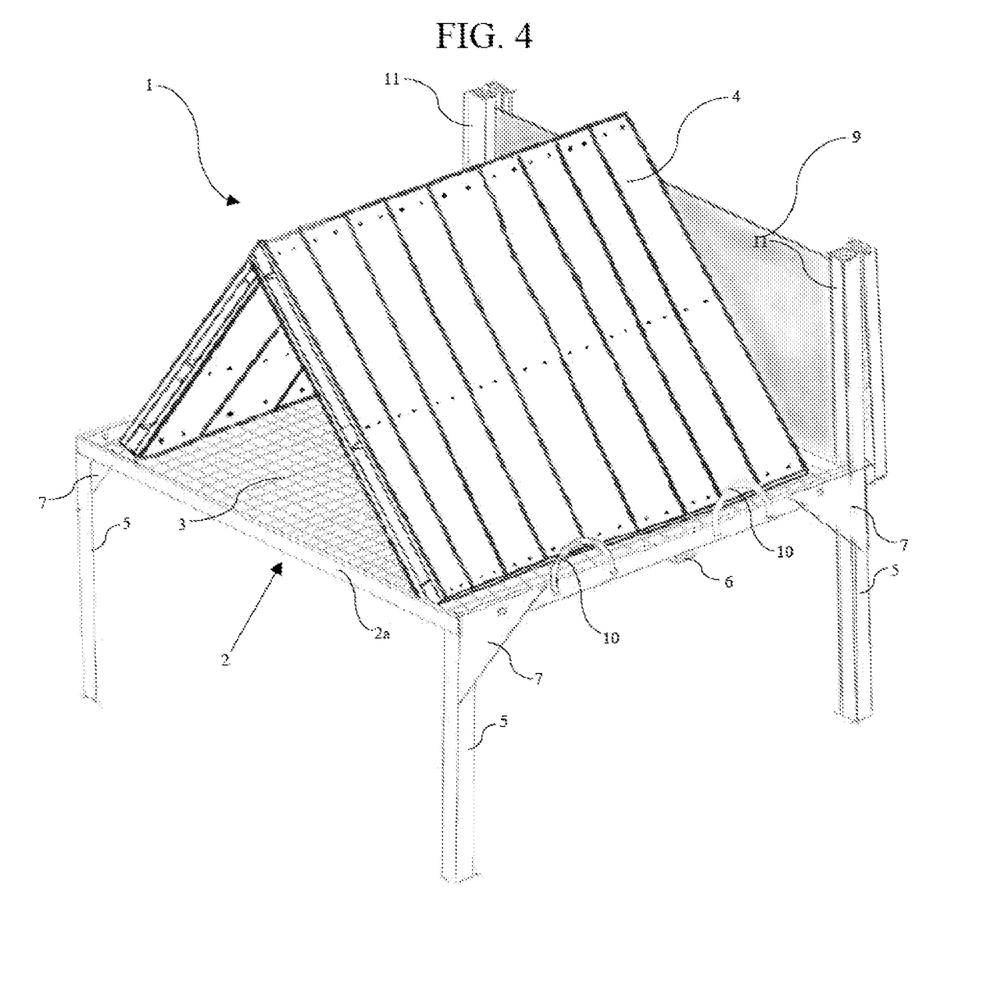
FIG. 4 provides a perspective view of the firefighter training assembly of FIG. 1, with various flammable materials.
Figure 5:
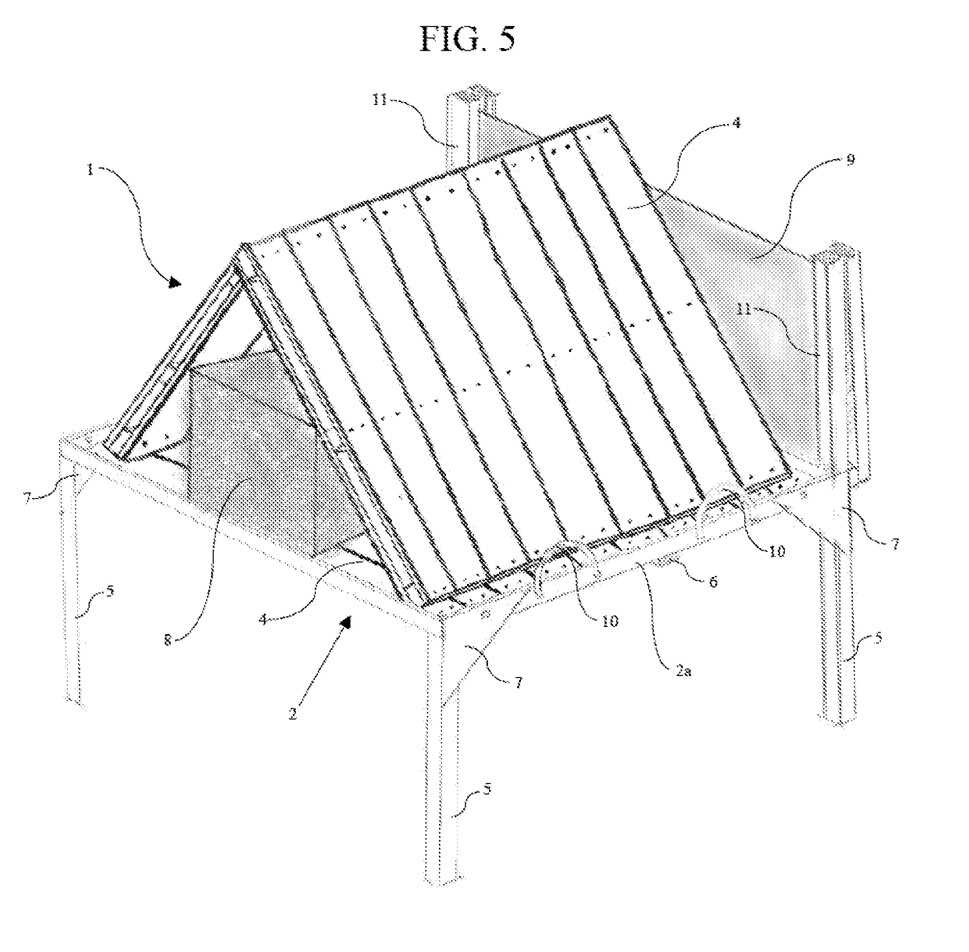
FIG. 5 provides a perspective view of the firefighter training assembly of FIG. 1, with various flammable materials.

Assembly 1 further contains several features to support and retain various flammable materials 4, 8, and 9 used during live fire training, such as is illustrated in FIGS. 4 and 5.

For example, to support first flammable material 4 (or main fuel) as it undergoes combustion, lateral support members 10 may be provided along opposing lateral sides of base 2 such that they protrude upwards. As can be seen in FIG. 4, lateral support members 10 are intended to prevent slippage of main fuel 4 outside of the assembly 1 during combustion. In this exemplary embodiment, lateral support members 10 are formed of curved rebar welded to the outside edges of base 2, with the curved edges oriented upwards. But other appropriate forms may also be used and attached in any known manner. In the exemplary embodiment, lateral support members 10 are attached in two sets of two onto parallel outer lateral sides of the base 2 and are positioned perpendicular to the center support structure 6. Other numbers of lateral support members 10 in other orientations could be used depending on the fuel material, size, and orientation. Lateral support members 10 may also be unnecessary in some embodiments.

In another example, retaining support members 11 are provided in the exemplary embodiment to support and position a second flammable material 9 with a higher glue or resin content than the main fuel 4 for combustion. The second flammable material 9 can be, for example, a sheet of medium-density fiberboard ("MDF"). In this exemplary embodiment, retaining support members 11 are arranged on a third lateral side of base 2 perpendicular to the lateral sides on which the lateral support members 10 are arranged. The retaining support members 11 extend vertically upward relative to base 2 and include a slot into which the second flammable material 9 may be inserted. In this exemplary embodiment, retaining support members are pairs of tube steel sections with roughly a one inch gap therebetween, which allows for slotting and retention of a sheet of MDF.

By retaining the second flammable material 9 in proximity to the main fuel 4 resting on the base 2 of the assembly 1 in the manner shown, the heat generated from the combustion of the main fuel 4 results in eventual combustion of the substance 9. The second flammable material 9 is selected to contain the minimum wood fiber percentage necessary to bring it within the NFPA 1403 standard while also containing the necessary glues and resins to produce favorable smoke conditions during training. Due to this arrangement, the radiative heat from the burning of the main fuel 4 will also ignite the second flammable material 9 (e.g., MDF). Due to the glue and resin content of the second flammable material 9, it burns more slowly and incompletely than the main fire and generates significantly more smoke. This additional smoke results in an environment that a firefighter would encounter in a typical modern house fire, thus making the addition of the second flammable material 9 favorable for training purposes.

While this exemplary embodiment utilizes MDF as the second flammable material 9, there are many other class A materials that have a higher relative glue or resin content to generate the desired smoke conditions and that still fall within the NFPA 1403 standard that may be utilized in conjunction with this invention. Moreover, while this exemplary embodiment utilizes retaining support members 11 arranged and shaped to support a sheet of MDF there are different numbers, shapes, and orientations of retaining support members 11 that could achieve the desired functionality in conjunction with other types of second flammable material 9.

A method of using the exemplary embodiment of the assembly 1 begins with the arrangement of a main fuel 4, such as a wood pallet, on base 2. When using wood pallets, a typical arrangement would use in a teepee shape (for two pieces, as shown in FIG. 4), or as a A-frame (for three pieces). The assembly 1 elevates the arrangement of main fuel 4 above the floor at a height h so that it does not burn directly on the ground of the training room or area. The arrangement at height h provides improved airflow for the combustion process and prevents unwanted scorching of the floor. The number of pieces in the arrangement of the main fuel 4 may be modified depending on the amount of heat desired. For example, colder ambient temperature conditions may require more heat, and thus, more pieces of main fuel 4.

Once the main fuel 4 is arranged on the base 2 of the assembly 1, the space between the pieces of the main fuel 4 may be filled with a starter flammable material 8, such as is shown in FIG. 5. Starter flammable material 8 is a class A substance that serves as a kindling, such as baled excelsior, straw, or hay. The combustion process is initiated through the ignition of this starter flammable material 8. Once lit, the heat from the starter flammable material 8 eventually ignites the main fuel 4 surrounding it, such as the wood pallets, and results in the sustained combustion of the combined arrangement of starter material and main fuel. In the exemplary embodiment, the starter material used is baled excelsior.

In addition to the main fuel 4 and the starter flammable material 8, a second flammable material 9 with a higher glue or resin content than wood pallets—such as MDF—is retained in proximity to the combined arrangement of main fuel 4 and starter flammable material 8 while those materials undergo combustion. This proximity is close enough such that the heat generated from the combustion of starter material and main fuel causes the second flammable material 9 to ignite. Because the second flammable material 9 contains glues and resins, it combusts more slowly and incompletely than the rest of the fire, thus emitting large amounts of smoke. This increased emission of smoke is desirable for preparing firefighters for conditions encountered in real fires involving modern housing materials that similarly incorporate high amounts of glue or resin.

In the exemplary embodiment of the present assembly, the base 2 features four sides arranged roughly as a square with each side being 48 inches long. The catwalk grating 3 is one inch thick, and the center support bar 6 is 48 inches long. The four attached legs 5 are 30 inches long in the height dimension h, and the support structures 11 that support the class A fuel substance 9 with the comparatively higher glue or resin content are each roughly 24 inches long. Therefore, the total dimensions of the exemplary assembly are 48" by 48" by 54".

Figure 6:
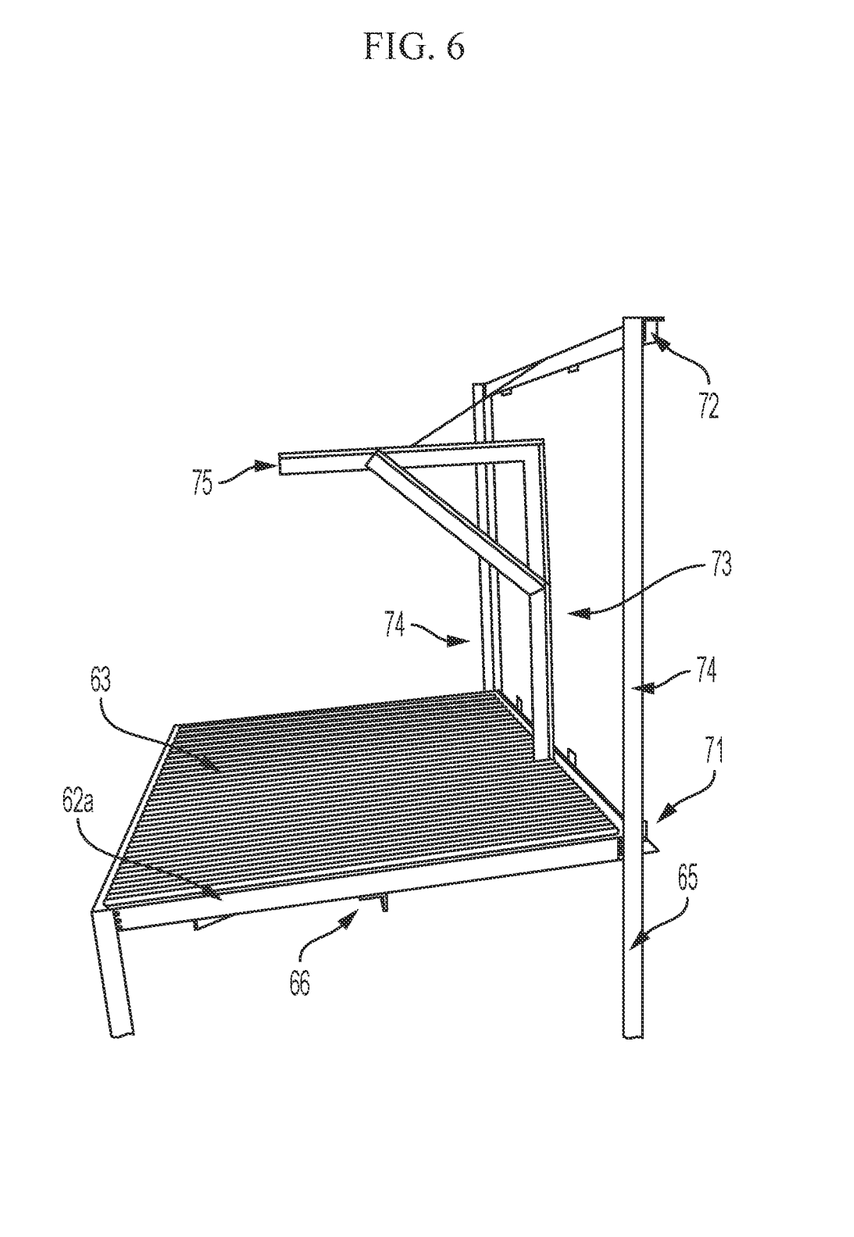
FIG. 6 provides a perspective view of a firefighter training assembly according to a second embodiment of the present disclosure.

A second exemplary embodiment of the inventive training assembly is shown in FIG. 6. The second exemplary embodiment utilizes a base 62 with frame 62a and lattice structure 63 supported by legs 65 in a manner similar to the first exemplary embodiment. However, it also differs in two aspects. First, rather than utilizing retaining members 11 that retain the vertical edges of the second flammable material 9, this embodiment provides upper retaining member 72 and lower retaining member 71, each having vertical tabs forming U-shaped retention areas, which retain the horizontal edges of second flammable material 9.

Second, the second exemplary embodiment provides an upper main fuel support structure 75 that supports and/or retains the upper edges of the main fuel 4 when it is arranged on base 62. In some instances, it may be desired to provide additional support for the pieces of main fuel 4 as they burn and structurally degrade so that they do not fall into each other when one piece structurally fails. Upper main fuel support structure 75 provides this support to the uppermost edges of main fuel 4, which may be laid on opposite edges of structure 75. As shown in this exemplary embodiment, upper main fuel support structure 75 may provide all the support necessary for main fuel 4, such that the lateral support members 10 are unnecessary. Upper main fuel support structure 75 may also be used in conjunction with lateral support members 10 to provide additional support and retention.

In this embodiment, upper main fuel support structure 75, along with legs 65 and frame 62a, is formed by portions of angle iron cut to appropriate lengths and welded together. But any appropriate construction may be used, such as the tube steel of the first embodiment.

The second exemplary embodiment shown in FIG. 6 may be used in a similar fashion as the first exemplary embodiment of FIG. 1.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:
1. An assembly for firefighter training, comprising:
   a base comprising a lattice structure;
   a plurality of legs supporting the base;
   first and second lateral support members arranged on first and second lateral sides of the base in opposition, respectively, and arranged to prevent lateral slippage of a first flammable material arranged on the base for burning;

first and second retaining members arranged on a third lateral side of the base, and arranged to retain a second flammable material.

2. The assembly of claim 1, wherein the first and second flammable materials are class A fuels, and the second flammable material comprises a higher glue or resin content than the first flammable material.

3. The assembly of claim 1, wherein the legs, the base, the lattice structure, the first and second lateral support members, and the first and second retaining members are steel.

4. An assembly for firefighter training, comprising:
a base comprising a lattice structure;
a plurality of legs supporting the base;
a main fuel support structure arranged above and parallel to the base, arranged to engage upper edges of a first flammable material arranged on the base for burning; and
first and second retaining members arranged on a lateral side of the base and extending perpendicular to the main fuel support structure, arranged to retain a second flammable material.

5. The assembly of claim 4, wherein the first and second flammable materials are class A fuels, and the second flammable material comprises a higher glue or resin content than the first flammable material.

6. The assembly of claim 4, wherein the legs, the base, the lattice structure, the main fuel support structure, and the first and second retaining members are steel.

7. A method for firefighter training, comprising:
providing an assembly comprising a base having a lattice structure, a plurality of legs supporting the base, first and second lateral support members arranged on first and second lateral sides of the base in opposition, and first and second retaining members arranged on a third lateral side of the base;
arranging a first flammable material on the base such that at least one of the first and second lateral support members may prevent lateral slippage of the first flammable material;
arranging a second flammable material such that it is retained by at least one of the first and second retaining members; and
causing the first flammable material to burn;
wherein the first and second flammable materials are arranged at a distance from each other that allows the radiative heat from the burning of the first flammable material to ignite the second flammable material.

8. The method of claim 7, wherein the first and second flammable materials are class A fuels, and the second flammable material comprises a higher glue or resin content than the first flammable material.

9. The method of claim 7, wherein the legs, the base, the lattice structure, the first and second lateral support members, and the first and second retaining members are steel.

10. A method for firefighter training, comprising:
providing an assembly comprising a base having a lattice structure, a plurality of legs supporting the base, a main fuel support structure arranged above and parallel to the base, and first and second retaining members arranged on a lateral side of the base and extending perpendicular to the main fuel support structure;
arranging a first flammable material on the base such that it engages the main fuel support structure;
arranging a second flammable material such that it is retained by at least one of the first and second retaining members; and
causing the first flammable material to burn;
wherein the first and second flammable materials are arranged at a distance from each other that allows the radiative heat from the burning of the first flammable material to ignite the second flammable material.

11. The method of claim 10, wherein the first and second flammable materials are class A fuels, and the second flammable material comprises a higher glue or resin content than the first flammable material.

12. The method of claim 10, wherein the legs, the base, the lattice structure, the main fuel support structure, and the first and second retaining members are steel.

* * * * *